US009722991B2

(12) United States Patent
Canning et al.

(10) Patent No.: US 9,722,991 B2
(45) Date of Patent: *Aug. 1, 2017

(54) CONFIDENCE-BASED AUTHENTICATION DISCOVERY FOR AN OUTBOUND PROXY

(71) Applicant: International Business Machines Corporation, Armonk, NY (US)

(72) Inventors: Simon Gilbert Canning, Upper Coomera (AU); Simon Winston Gee, Varsity Lakes (AU); Shane Bradley Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,061

(22) Filed: Jan. 4, 2016

(65) Prior Publication Data
US 2016/0119327 A1 Apr. 28, 2016

Related U.S. Application Data

(63) Continuation of application No. 13/547,750, filed on Jul. 12, 2012, now Pat. No. 9,246,907.

(51) Int. Cl.
*G06F 7/04* (2006.01)
*H04L 29/06* (2006.01)
(Continued)

(52) U.S. Cl.
CPC ...... *H04L 63/0815* (2013.01); *H04L 63/0281* (2013.01); *H04L 63/0884* (2013.01);
(Continued)

(58) Field of Classification Search
CPC ............................ H04L 63/0815; H04L 63/20
(Continued)

(56) References Cited

U.S. PATENT DOCUMENTS 8,332,627 B1 * 12/2012 Matthews ........... H04L 63/0869
713/155
8,544,072 B1 * 9/2013 Masone .............. H04L 63/0815
726/10
(Continued)

FOREIGN PATENT DOCUMENTS

WO WO2011006231 1/2011

OTHER PUBLICATIONS

Alotaibi et al, "From Access Management System (AMS) to a Ubiquitous Access Management System (UbAMS), over Federated Access Management System (FAMS)," Multimedia and Ubiquitous Engineering (MUE), 2011 5th FTRA International Conference on Year: 2011, pp. 311-316.*

(Continued)

*Primary Examiner* — Roderick Tolentino
(74) *Attorney, Agent, or Firm* — Jeffrey S. LaBaw; David H. Judson

(57) ABSTRACT

A confidence-based authentication discovery scheme is implemented at a proxy. The scheme assumes that some level of unauthenticated browsing is allowed prior to enforcing authentication at the proxy. Once a known and trusted set of identity providers has been accessed and the user is required to authenticate at the proxy (e.g., as a result of policy), the proxy initiates Federated Single Sign-On (F-SSO) to one or more (or, preferably, all) known sites accessed by the browser. This F-SSO operation is performed seamlessly, preferably without the user's knowledge (after the user allows an initial trust decision between the proxy acting as a service provider and the external identity provider). The proxy collates the results and, based on the trust it has with those sites, produces a confidence score. That score is then used as input into policy around whether or not a user should be permitted to access a particular site.

18 Claims, 4 Drawing Sheets

(51) Int. Cl.
*H04L 29/08* (2006.01)
*H04L 9/32* (2006.01)

(52) U.S. Cl.
CPC .............. *H04L 63/20* (2013.01); *H04L 67/02* (2013.01); *H04L 9/321* (2013.01)

(58) Field of Classification Search
USPC ...................................................... 726/26–30
See application file for complete search history.

(56) References Cited

U.S. PATENT DOCUMENTS

| | | | |
|---|---|---|---|
| 8,561,161 B2 * | 10/2013 | Blakley, III | ........ H04L 63/0815 709/229 |
| 2008/0046984 A1 * | 2/2008 | Bohmer | .............. H04L 63/0853 726/5 |
| 2011/0158406 A1 * | 6/2011 | Marcia | .................... G06F 21/10 380/200 |
| 2011/0213688 A1 | 9/2011 | Santos et al. | |
| 2011/0276493 A1 * | 11/2011 | Graham, III | ......... G06Q 20/102 705/53 |
| 2012/0260322 A1 * | 10/2012 | Logan | ..................... G06F 21/33 726/6 |
| 2013/0117832 A1 * | 5/2013 | Gandhi | ................. H04L 9/3271 726/7 |
| 2013/0212665 A1 * | 8/2013 | Goyal | .................... G06F 21/00 726/8 |

OTHER PUBLICATIONS

Ghazizadeh et al., "A trust based model for federated identity architecture to mitigate identity theft ," o Internet Technology and Secured Transactions, 2012 International Conference for Year: 2012, pp. 376-381.*

* cited by examiner

CONFIDENCE-BASED AUTHENTICATION DISCOVERY FOR AN OUTBOUND PROXY

BACKGROUND OF THE INVENTION

Technical Field

This disclosure relates generally to authenticating users in a network environment in which it is desired to prevent unrestricted access to accessible networks, such as the Internet.

Background of the Related Art

User authentication is one function that service providers offer to ensure that users accessing resources (e.g., applications, web content, etc.) are authorized to do so. To ensure that a user is not an imposter, service providers (e.g., web servers) generally ask for a user's username and password to prove identity before authorizing access to resources. Single sign-on (SSO) is an access control mechanism which enables a user to authenticate once (e.g., provide a username and password) and gain access to software resources across multiple systems. Typically, an SSO system enables user access to resources within an enterprise or an organization. Federated Single Sign-on (F-SSO) extends the concept of single sign-on across multiple enterprises, thus establishing partnerships between different organizations and enterprises. F-SSO systems typically include application level protocols that allow one enterprise (e.g., an identity provider) to supply a user's identity and other attributes to another enterprise (e.g., a service provider). In other words, an F-SSO system helps transport the user's credentials from the identity provider to the service provider using any suitable protocol. Typically, current F-SSO techniques use HTTP as the transport protocol.

HTTP outbound proxies are used in environments where users are connected to a network and can access certain resources but are required to authenticate to have access to additional resources on the network (such as the Internet). One such example is in public wireless network hot spots. Users can access the wireless network but are required to authenticate to access the Internet (via a captive portal). Another example is in a corporate network where users may be able to access the intranet but must authenticate to an in-line device (e.g., a proxy server) before being allowed to access the Internet. Some such devices allow access to certain web sites but require authentication to others. A paradigm example would be an educational environment in which an outbound proxy is used to allow teachers to access a web site (e.g., YouTube or Facebook) while preventing students from doing so.

A problem with the existing approach of requiring the user to authenticate is that this is cumbersome to the user experience. From the user's point of view, edge devices on the network that monitor the outgoing traffic should be as transparent as possible and require minimal user interaction to authenticate the user. On the other hand, enterprises or businesses typically want to write and enforce policy around what can content can and cannot be accessed from within their network environments, and they also have a need or desire to know (or to have a level of confidence) about who a user is to enforce business or other security policy. Some techniques and partial solutions associated with this problem space include requiring the user to authenticate at the in-line device, collating log-in events (e.g., from a corporate directory) and correlating them with a user's workstation IP/MAC address, making a "best-effort" assumption about the user based on a static set of MAC-to-IP address mappings within a specific network segment, and the like. More complex and expensive approaches rely upon monitoring and analyzing behavioral patterns to generate models against which current activity cannot be compared to determine whether to permit authentication.

BRIEF SUMMARY

A "confidence-based authentication discovery" scheme is implemented at an intermediary in-line network device, such as an HTTP outbound proxy. The scheme assumes that some level of unauthenticated browsing is allowed prior to enforcing authentication at the proxy. This could be to a known set of identity providers or allowed sites, or it could be based on a configurable policy. Once a known and trusted set of identity providers has been accessed and the user is required to authenticate at the proxy (e.g., as a result of policy), the proxy initiates Federated Single Sign-On (F-SSO) to one or more (or, preferably, all) known sites accessed by the browser. This F-SSO operation is performed seamlessly, preferably without the user's knowledge (after the user allows an initial trust decision between the proxy acting as a service provider and the external identity provider). The proxy collates the results and, based on the trust it has with those sites, produces a confidence score. That score is then used as input into policy around whether or not a user should be permitted to access a particular site.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
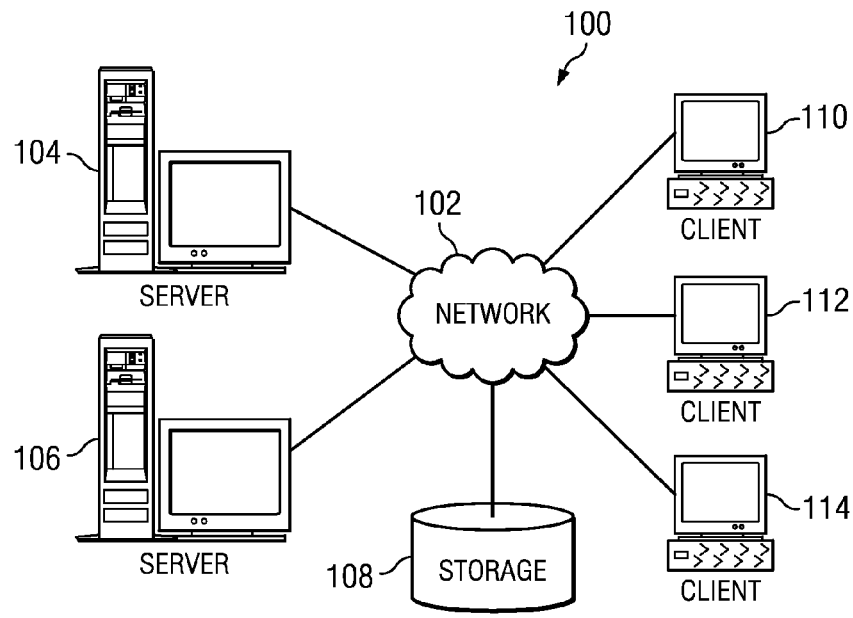
FIG. 1 depicts an exemplary block diagram of a distributed data processing environment in which exemplary aspects of the illustrative embodiments may be implemented.
Figure 2:
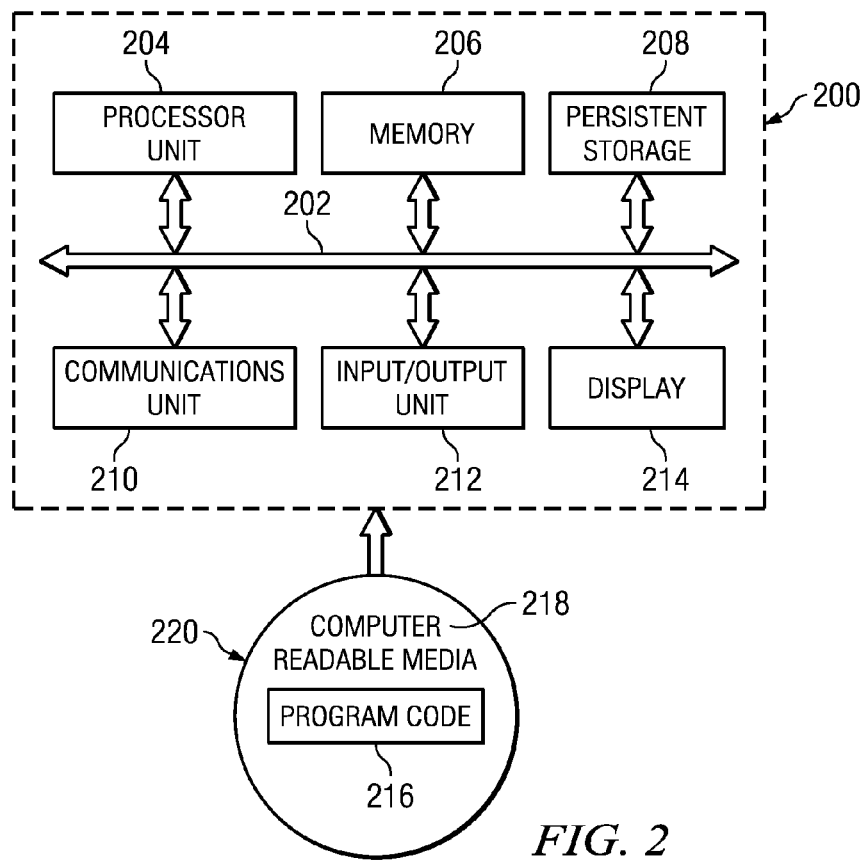
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Single sign-on (SSO) is an access control mechanism which enables a user to authenticate once (e.g., by providing a user name and password) and gain access to software resources across multiple systems. Typically, an SSO system enables user access to resources within an enterprise or an organization. Federated single sign-on (F-SSO) extends the concept of single sign-on across multiple enterprises, thus establishing partnerships among different organizations and enterprises. F-SSO systems typically include protocols, such as SAML, that allow one enterprise (e.g., an identity provider) to supply a user's identity and other attributes to another enterprise (e.g., a service provider). In other words, an F-SSO system helps transport the user's credentials from the identity provider to the service provider in a trusted manner using a suitable protocol, typically HTTP.

Figure 3:
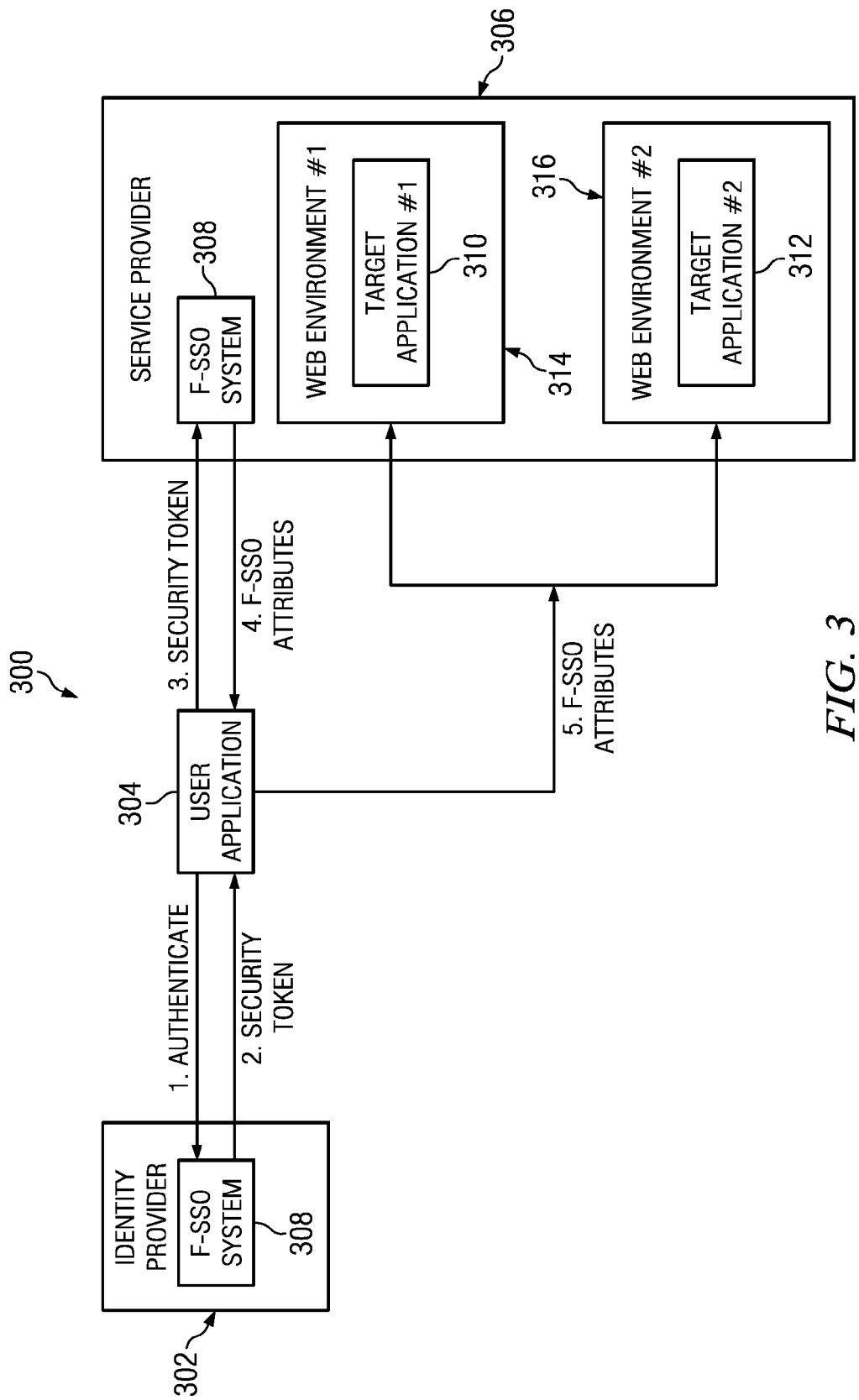
FIG. 3 illustrates a known federated single sign-on (F-SSO) operation.

FIG. 3 is a block diagram illustrating the typical flow of operations in a known federated single sign-on (F-SSO) process. As shown in FIG. 3, the F-SSO process 300 involves communications between an identity provider 302, a user application 304, and a service provider 306. The identity provider 302 and the service provider 304 include an F-SSO system 308, which includes logic to authenticate a user, establish the user's credentials, and generate an encrypted security token (e.g., cookie) including user information. Additionally, the service provider 306 can also include one or more target applications 310 and 312. The target applications can reside within the same web environment or be a part of different web environments 314 and 316 (e.g., Apache, WebSphere® etc.) within the same service provider 306. The user application 304 can include logic (e.g., a web browser) to present content (e.g., web pages) to the user.

In one embodiment, the user application 304 first authenticates to the identity provider 302 (e.g., providing a username and password) as indicated by step 1. In step 2, the identity provider's F-SSO system 308 returns a security token to the user. This security token may be time-sensitive (e.g., can include a time stamp) and cryptographically signed. The security token can include the user's identity (e.g., username) and other attributes (e.g., user identification number) that the identity provider 302 wishes to provide to the service provider 306. The user application 304 can present the security token to the service provider's F-SSO system using any suitable technique (e.g., HTTP request) and message structure (e.g., using HTTP query strings, HTTP POST data, etc.) defined by the F-SSO protocol (refer to step 3). In step 4, the service provider's F-SSO system 308 validates the cryptographic signature of the security token to confirm the token's authenticity of origin and that the contents of the security token are trustworthy. The service provider's F-SSO system can also extract the user's identity and related attributes from the security token and generate an F-SSO attributes cookie including the user's identity and attributes.

After achieving single sign-on (i.e., conveying user attributes from the identity provider's F-SSO system to the service provider's F-SSO system), if the user wants to access a target application (e.g., 310) hosted by the service provider 306, the user application 304 may pass an F-SSO attributes cookie obtained from the service provider's F-SSO system 308 to the target application (as in step 5). In the alternative, attributes may be stored at a proxy and passed as a user's request passes through the proxy so that cookies are not required. In this example embodiment, the transfer of user attributes (e.g., in an F-SSO cookie) is done in a trustworthy and secure manner and can be performed on the basis of F-SSO prescribed protocols (typically HTTP). If the data contained within an F-SSO attributes cookie is accepted and understood by the target application (e.g., if the target application can decrypt and retrieve the cookie's contents), the target application (e.g., e10) validates it and creates a session for the user. In some embodiments, the target applications (e.g., 310) understand the F-SSO attributes cookie, or they can be part of the F-SSO process (i.e., the target application may not include an F-SSO system).

As shown, each target application can be located in a different web environment, with different authentication mechanisms and different requirements. Without limitation, a target application may be located within the enterprise, or it may be located within a cloud-based operating environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. The cloud computing infrastructure typically comprises a set of functional abstraction layers including hardware/software layer, a virtualization layer, a management layer, and a workload layer. The virtualization layer provides an abstraction layer from which the following examples of virtual entities may be provided: virtual servers; virtual storage; virtual networks, including virtual private networks; virtual applications and operating systems; and virtual clients. The management layer provides dynamic procurement of computing resources and other resources that are utilized to perform tasks within the cloud computing environment. The workloads layer provides the functionality for which the cloud computing environment may be utilized. Typically, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli® Federated Identity Manager (TFIM) that is available from IBM® Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application that is being made available for access via the cloud. One or more databases are used to store directory, log, and other working data. All of these components (included the front end identity manager) are located "within" the cloud, but this is not a requirement.

Confidence-Based Authentication Discovery for an Outbound Proxy

Figure 4:
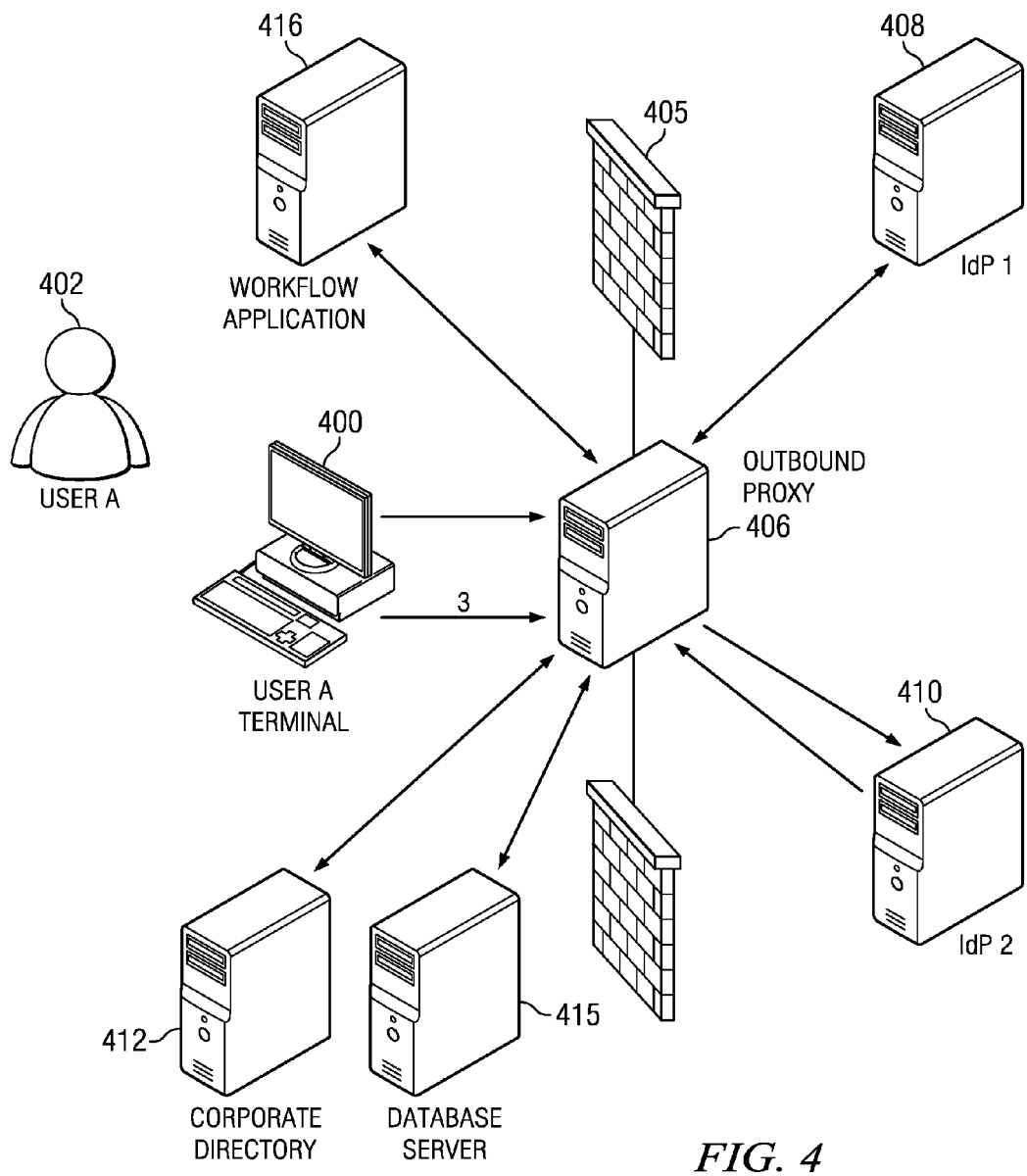
FIG. 4 depicts a representative enterprise environment in which the technique of this disclosure is implemented.

FIG. 4 illustrates a typical enterprise environment in which the technique of this disclosure is implemented. This environment is not intended to be limiting, as the technique may be implemented in any environment in which users are connected to a network and access certain resources but are required to authenticate to have access to additional resources on the network (such as the Internet). The environment includes an intermediary in-line device to enforce this functionality. A representative device is an HTTP outbound proxy.

As will be seen, the technique of this disclosure, which is referred to as "confidence-based authentication discovery," assumes that some level of unauthenticated browsing is allowed prior to enforcing authentication at the proxy. This could be to a known set of identity providers or allowed sites, or it could be based on a policy, such as "allow unauthenticated browsing for 60 seconds prior to trying to perform login to seed potential external IdP targets with sessions." Once a known and trusted set of identity providers has been accessed and the user is required to authenticate at the proxy (e.g., as a result of policy), the proxy initiates F-SSO to one or more (or, preferably, all) known sites accessed by the browser. This F-SSO operation is performed seamlessly, preferably without the user's knowledge (after the user allows an initial trust decision between the proxy acting as a service provider and the external identity provider). The proxy collates the results and, based on the trust it has with those sites, produces a confidence score. That score is then used as input into policy around whether or not a user should be permitted to access a particular site.

As seen in FIG. 4, the enterprise comprises a user terminal 400 accessible by user 402. The outbound HTTP proxy 406 acts as an intermediary in-line device to allow access to certain web sites but to require authentication to others. As will be seen, the proxy 406 implements the confidence-based authentication discovery scheme, as will be described.

In this illustrative (but non-limiting) embodiment, the HTTP outbound proxy is located in the corporate (enterprise) network at or adjacent an enterprise firewall (or DMZ) 405. The proxy 406 is in-line between the user terminal 400 and one or more external identity providers, such as a first identity provider (IdP) 408, and a second IdP 410. An IdP may be associated with a web site that requires a user to authenticate in order to obtain access to a resource at the site. A corporate directory (e.g., LDAP, Active Directory, or the like) is supported on corporate directory 412, and a database server 414 is used to store enterprise data. A workflow application 416 may be used to implement a workflow. The particular workflow implemented may be configured by a security policy stored in the corporate directory (or other policy management system).

In a typical use case scenario, user A 402 accesses a network segment that requires authentication to the outbound proxy 406 via his or her computing device, such as terminal 400. In general, the outbound proxy 406 interacts with the IdP, discovers the user identity, and creates and maintains a session for that identity.

The proxy 406 comprises a set of functional components, one or more in-memory or data stores that perform caching, and one or more data sets that are maintained and used by the proxy components. These functional components, caches and data sets are shown as being logically distinct, but one or more of them may be combined, aggregated or integrated, as the case may be. In the alternative, one or more functions or data sets may be located remotely from the proxy, or the proxy functionality may be distributed across multiple machines, devices, programs, or the like.

Figure 5:
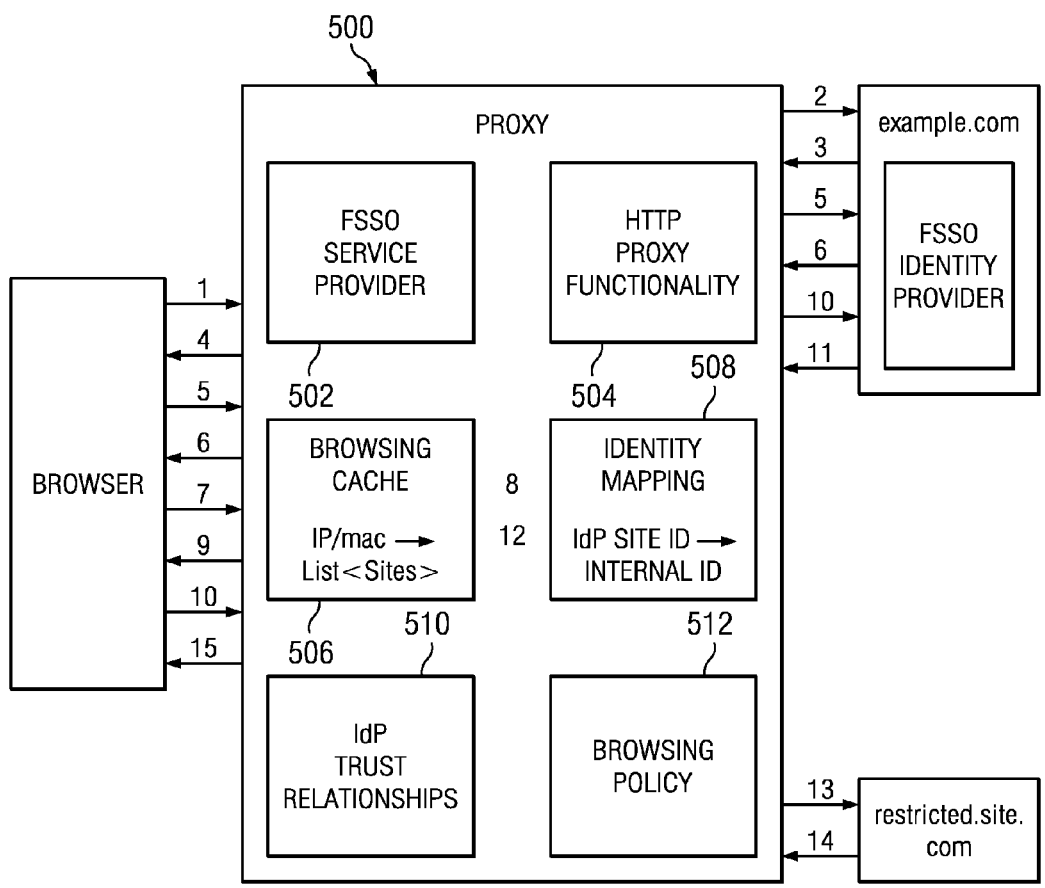
FIG. 5 illustrates a process flow of a representative embodiment.

With reference now to FIG. 5, the proxy 500 comprises an F-SSO service provider function 502, an HTTP proxy function 504, a browsing cache 506, an identity mapping cache 508, a set of IdP trust relationships 510, and a browsing policy 512. The F-SSO service provider function 502 implements the F-SSO protocol, such as described above with respect to FIG. 3. The HTTP proxy function 504 performs conventional HTTP proxy functions, according to the HTTP or HTTPS protocols. The browsing cache 506 is a dedicated data store or in-memory region for caching certain data. The identity mapping cache 508 associates identity provider site identifiers with internal data identifying a user. This internal data represents how the proxy identifies the user. The browsing policy 510 identifies which sites or domains can be accessed and which require authentication. A representative proxy may be implemented on the computing machine architecture shown in FIG. 2. More generally, and as noted above, one or more of these functions or data sets may be located across one or more machines, devices, programs, or the like.

FIG. 5 also illustrates a process flow of the method for confidence-based authentication discovery according of this disclosure. The process flow represented here is merely an illustrative use case provided for exemplary purposes; it is not intended to be limiting.

The method begins at step (1) with an unauthenticated user at the browser accesses a first resource, example.com, via the proxy. The HTTP proxy function 504 is used for this purpose. At step (2), the proxy determines the request does not require authentication because example.com is a trusted external IdP. The proxy then adds an entry (e.g., the IP/MAC address combination associated with the access request) in its browsing cache 506, and uses the HTTP proxy function 504 to forward the request to example.com. At step (3), the example.com site sends a response that indicates authentication is required. At step (4), the proxy receives the response from the site and (using the proxy function 504) forwards it along to the browser. The routine continues at step (5) when the browser receives the authentication response from example.com. The browser then submits the authentication form to example.com via the proxy. This step may or may not involve the user entering login information in the authentication form. At step (6), example.com receives the authentication form, performs the authentication, and returns the content that the user desires to view.

At step (7), assume now that the browser accesses the resource restricted.site.com via the proxy. At step (8), the proxy determines that it must authenticate the user to access this site. This determination causes the functionality of this disclosure to be implemented by the proxy. In particular, for this particular domain, the proxy examines its browsing cache 506 for the IP/MAC address combination associated with the request. The proxy then identifies any trusted IdPs that have been accessed, which information is represented by the set of IdP trust relationships 510. At step (9), the proxy returns to page to the browser. This page preferably includes an HTML mechanism (e.g., iframes) that starts F-SSO flows for one or more (and preferably all) known trusted IdPs that have been accessed previously (and for whom information 510 is being maintained or is otherwise accessible by the proxy). As is well-known, an HTML iframe displays a web page within a web page. Steps (1)-(6) above describe example.com, which is a trusted IdP, and there may be one or more (or even many) others. For each such trusted IdP, the returned iframe starts a particular F-SSO flow. This function is implemented by the F-SSO service provider function 502. Representative F-SSO flows include an OpenID checkid_immediate flow, a SAML 2.0 HTTP POST binding, or an OAuth 2.0 flow where the protected resource is the user's identity information.

At step (10), the browser automatically responds to the F-SSO flows in the one or more iframes. The routine then continues at step (11), where the example.com IdP returns to the proxy the identity of the user who accessed example.com. The other IdPs identified in step (8) respond in a like manner. Thus, steps (10)-(11) are repeated for multiple IdPs (based on previous browsing habits). At step (12), the proxy performs a look-up into its identity mapping cache the mapping between the external IdP example.com user and the internal user. Upon successful identification of the user, the routine continues at step (13) to calculate a confidence level. Based a policy (and the confidence level value), the original request to restricted.site.com is allowed or disallowed. At step (14), and assuming the request to restricted.site.com has been allowed by the policy, the restricted.site.com server returns the content to the proxy, which then returns it to the browser. This completes the process.

The simplest form of a confidence level may be LOW or HIGH, or LOW, MEDIUM and HIGH, or the like, where the particular confidence level is calculated based on a static mapping between IdPs and a confidence level plus one or more combinatorial functions. Thus, as an example, assume that the confidence level for a static set of IdPs is as follows: internal intranet IDP (value=10 (HIGH)), known trusted external IdP (value=5 (MEDIUM)), and unknown external IdP (1 (LOW)). Assume further that the following attributes are returned by the IdP and, according to a rule, are used to enhance these static confidence levels: e.g., "email address is company address" (value=10) or "email address is not company address" (value=−1). Of course, these numerical values are merely for illustration purposes. Based on the rule (and these sample values), the following scores would then be generated: internal intranet returning an email matching a company domain (10+10=20), known trusted IdP returning an email matching a company domain (10+5=15), unknown external IdP returning an email matching a company domain (1+10=11), unknown external IdP returning an email not matching a company domain (1+(−1)=0), and so forth. Rules of this type may be statically defined in a policy, and a combination of IdP confidence scores and attribute matching may be combined in one or more flexible ways to define the final score (and thus the final confidence level). A more complex form of confidence level calculation may use some level of analytics, e.g., to determine trends based on how successfully a user has been identified in the past for a particular IdP.

The subject technique may be implemented using known F-SSO protocols that assert a user identity at a service provider. These known F-SSO protocols include, for example, OpenID, SAML (Post/Artifact), or an OAuth-protected resource request. The identity information is visible to the proxy because it is acting as a service provider (SP) in the F-SSO flow in the same way that any other SP would obtain identity information. For example, in the SAML 2.0 F-SSO case, this identity information is passed using one of: a browser HTTP POST, a redirect, or some artifact binding.

As an alternative embodiment, an identity manager (e.g., IBM Tivoli Federated Identity Manager) may be used as the service provider (SP) part of the F-SSO flow, acting on behalf of the HTTP outbound proxy.

The technique of this disclosure provides significant advantages. A main advantage of this approach is that the user is authenticated at the outbound in-line device without explicitly authenticating. This approach also uses existing open standards (e.g., F-SSO) to achieve seamless single sign-on to a device that would normally require explicit authentication. Additionally, the approach allows flexibility in defining and enforcing policy around accessing resources and their appropriate confidence levels with respect to the user's identity. In the authentication scheme of this disclosure, the user need not interactively authenticate to the in-line device. Rather, the user's unauthenticated browsing habits are used as input into the identity establishment process. The approach enables the proxy to enforce policy based on how confident it is that it has identified the user appropriately. The approach is generic for various types of platforms, and works regardless of whether machines are moved across different network segments in the network. The technique also solves a known mobility problem where previously a mapping of MAC to IP address was required to be stored for a specific machine in order to enforce authentication of a user of that machine.

As has been described, this disclosure provides a solution where the user is identified by an intermediary in-line device by using federated single sign-on (FSSO) protocols when the device detects that an F-SSO enabled site is being accessed and no session currently exists. The F-SSO enabled site may be identified on a list of known and trusted identity providers (IdPs), or it may be discovered by the in-line device. Depending on the IdP and the amount of trust the in-line device has with the IdP, the in-line device can use a confidence score to enforce a policy before permitting the user to access the desired resource. According to the preferred embodiment, analytics are used to determine which sites a browser has accessed and to identify potential external identity providers to leverage as part of authenticating a user with respect to a particular site. Preferably, the user is identified based on the user's unauthenticated browsing habits. The user is then seamlessly authenticated at the in-line device with minimal user interaction. Preferably, a confidence level is calculated based on the results from external identity providers, and the act of authenticating can be from an identity provider external to the network (e.g., an intranet) from which the access is initiated. In this manner, the external identity also is seamlessly linked to an internal user account.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the F-SSO functions may be hosted within or external to the cloud.

Still more generally, the subject matter described herein can take the form of an entirely hardware embodiment, an entirely software embodiment or an embodiment containing both hardware and software elements. In a preferred embodiment, the confidence-based authentication discovery function is implemented in software, which includes but is not limited to firmware, resident software, microcode, and the like. The data retrieved by the outbound proxy device can be configured into a data structure (e.g., an array, a linked list, etc.) and stored in a data store, such as computer memory. Furthermore, as noted above, the functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the proxy and F-SSO components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The proxy and F-SSO functions may be implemented as an adjunct or extension to an existing access manager or policy management solution.

As noted above, although SAML has been described as the preferred assertion format, this is not a limitation, as other techniques (e.g., attribute certificates) for providing the authentication data may be used.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

While the disclosed technique has been described in the context of an HTTP outbound proxy, this is not a limitation. The functionality may be implemented in any intermediary in-line device that can implement the F-SSO protocol.

Having described our invention, what we now claim is as follows.

The invention claimed is:

1. A method of controlling access to a protected resource, comprising:
receiving a request to access a protected resource from a user not currently authenticated to access the protected resource;
in response, and without additional user input, performing a confidence-based authentication discovery operation by:
initiating federated single sign-on flow to each of one or more known and trusted identity providers with whom the user has previously authenticated;
receiving results from the one or more flows, each result indicating whether an identity of the user as asserted in the flow is recognized by the identity provider with whom the user has previously authenticated; and
analyzing information returned in the results from the one or more flows to generate a score indicating a confidence that an identity of the user matches an identity of a user that has previously authenticated to one or more known and trusted identity providers; and
permitting access to the protected resource based on the score.

2. The method as described in claim 1 wherein the analyzing step also applies policy to the score.

3. The method as described in claim 1 wherein the flow is initiated by returning to a browser a markup language frame element.

4. The method as described in claim 1 further including maintaining information about each of the one or more known and trusted identity providers with whom the user has previously authenticated.

5. The method as described in claim 4 wherein the information about a known and trusted identity provider includes an IP/MAC address combination associated with a browser instance from which the user has been previously authenticated.

6. The method as described in claim 1 wherein the score is generated by applying a combinatorial function to the information returned in the results from the flows.

7. Apparatus to control access to a protected resource, comprising:
a processor;
computer memory holding computer program instructions executed by the processor to:
receive a request to access a protected resource from a user not currently authenticated to access the protected resource;
in response, and without additional user input, perform a confidence-based authentication discovery operation by:
initiating federated single sign-on flow to each of one or more known and trusted identity providers with whom the user has previously authenticated;
receiving results from the one or more flows, each result indicating whether an identity of the user as asserted in the flow is recognized by the identity provider with whom the user has previously authenticated; and
analyzing information returned in the results from the one or more flows to generate a score indicating a confidence that an identity of the user matches an identity of a user that has previously authenticated to one or more known and trusted identity providers; and
permitting access to the protected resource based on the score.

8. The apparatus as described in claim 7 wherein the analyzing step also applies policy to the score.

9. The apparatus as described in claim 7 wherein the flow is initiated by returning to a browser a markup language frame element.

10. The apparatus as described in claim 7 further including maintaining information about each of the one or more known and trusted identity providers with whom the user has previously authenticated.

11. The apparatus as described in claim 10 wherein the information about a known and trusted identity provider includes an IP/MAC address combination associated with a browser instance from which the user has been previously authenticated.

12. The apparatus as described in claim 7 wherein the score is generated by applying a combinatorial function to the information returned in the results from the flows.

13. A computer program product in a non-transitory computer readable medium for use in a data processing system to control access to a resource, the computer program product holding computer program instructions which, when executed by the data processing system, perform a method of controlling access to a protected resource, the method comprising:
receiving a request to access a protected resource from a user not currently authenticated to access the protected resource;
in response, and without additional user input, performing a confidence-based authentication discovery operation by:
initiating federated single sign-on flow to each of one or more known and trusted identity providers with whom the user has previously authenticated;
receiving results from the one or more flows, each result indicating whether an identity of the user as asserted in the flow is recognized by the identity provider with whom the user has previously authenticated; and
analyzing information returned in the results from the one or more flows to generate a score indicating a confidence that an identity of the user matches an identity of a user that has previously authenticated to one or more known and trusted identity providers; and
permitting access to the protected resource based on the score.

14. The computer program product as described in claim 13 wherein the analyzing step also applies policy to the score.

15. The computer program product as described in claim 13 wherein the flow is initiated by returning to a browser a markup language frame element.

16. The computer program product as described in claim 13 further including maintaining information about each of the one or more known and trusted identity providers with whom the user has previously authenticated.

17. The computer program product as described in claim 16 wherein the information about a known and trusted identity provider includes an IP/MAC address combination associated with a browser instance from which the user has been previously authenticated.

18. The computer program product as described in claim 1 wherein the score is generated by applying a combinatorial function to the information returned in the results from the flows.

* * * * *